United States Patent [19]
Feng et al.

[11] Patent Number: 5,982,963
[45] Date of Patent: Nov. 9, 1999

[54] TUNABLE NONLINEARLY CHIRPED GRATING

[75] Inventors: Kai-Ming Feng, Alhambra; Jin-Xing Cai, Los Angeles; Alan Eli Willner, Los Angeles; Victor Grubsky, Los Angeles; Dmtry Starodubov, Los Angeles; Jack Feinberg, Manhattan Beach, all of Calif.

[73] Assignee: University of Southern California, Los Angeles, Calif.

[21] Appl. No.: 09/027,345

[22] Filed: Feb. 20, 1998

Related U.S. Application Data

[60] Provisional application No. 60/069,498, Dec. 15, 1997.

[51] Int. Cl.$^6$ .................................................. G02B 6/34
[52] U.S. Cl. ............................ 385/37; 385/10; 385/7; 385/12; 385/39; 372/64; 372/102; 359/188; 359/290
[58] Field of Search ............................ 385/37–43, 1–12; 372/6, 27, 64, 96, 102; 359/188, 290

[56] References Cited

U.S. PATENT DOCUMENTS

| | | | |
|---|---|---|---|
| 5,450,427 | 9/1995 | Fermann et al. | 372/18 |
| 5,499,134 | 3/1996 | Galvanauskas et al. | 359/333 |
| 5,511,083 | 4/1996 | D'Amato et al. | 372/6 |
| 5,532,868 | 7/1996 | Gnauck et al. | 395/332 |
| 5,541,947 | 7/1996 | Mourou et al. | 372/25 |
| 5,633,885 | 5/1997 | Galvanauskas et al. | 372/25 |
| 5,675,674 | 10/1997 | Weis | 385/12 |
| 5,808,779 | 9/1998 | Weis | 385/1 |

OTHER PUBLICATIONS

Cruz et al., "Fibre Bragg Gratings Tuned and Chirped Using Magnetic Fields" Electronic Letters, May 1, 1997 vol. 33 3:235–236.

Ronald D. Esman, "High Bandwidth Traveling Wave Polymeric In–Line Fibre Modulator" CLEO '97 Microwave/Analog p. 293 Technology, No Month.

Arce–Diego et al., "Fiber Bragg grating as an Optical Filter Tuned by a Magnetic Field" Optic Letters, vol. 22,No. 9 pp. 803–805 May 1, 1997.

R.J. Nuyts et al., "Performance Improvement of 10 Gb/s Standard Fiber Transmission Systems by Using the SPM Effect in the Dispersion Compensating Fiber" IEEE Photonics Technology Letters vol. 8, No. 10 1406–1408 (Oct. 1996).

*Primary Examiner*—Phan T. H. Palmer
*Attorney, Agent, or Firm*—Fish & Richardson P.C.

[57] ABSTRACT

A nonlinearly chirped fiber grating for achieving tunable dispersion compensation, chirp reduction in directly modulated diode lasers, and optical pulse manipulation. A dynamical dispersion compensation mechanism can be implemented in a fiber communication system based on such a nonlinearly chirped fiber grating.

52 Claims, 14 Drawing Sheets

302 Before Stretched
304 After Stretched

Wavelength (nm)

Wavelength (nm)

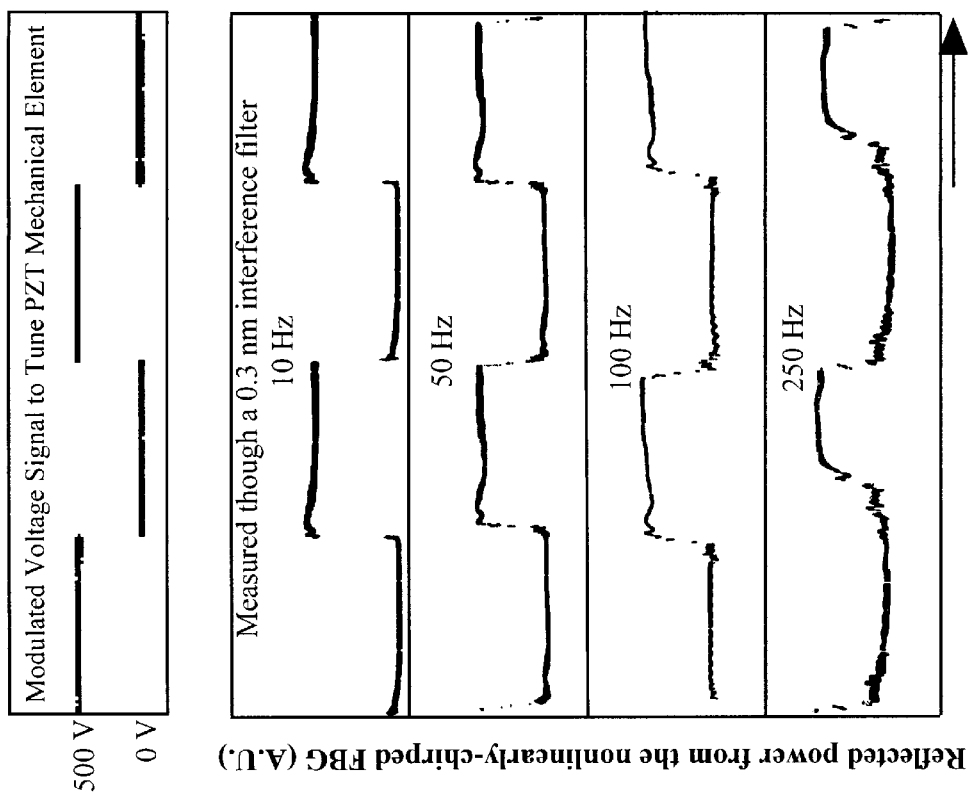
*FIG. 6E*
*FIG. 6F*
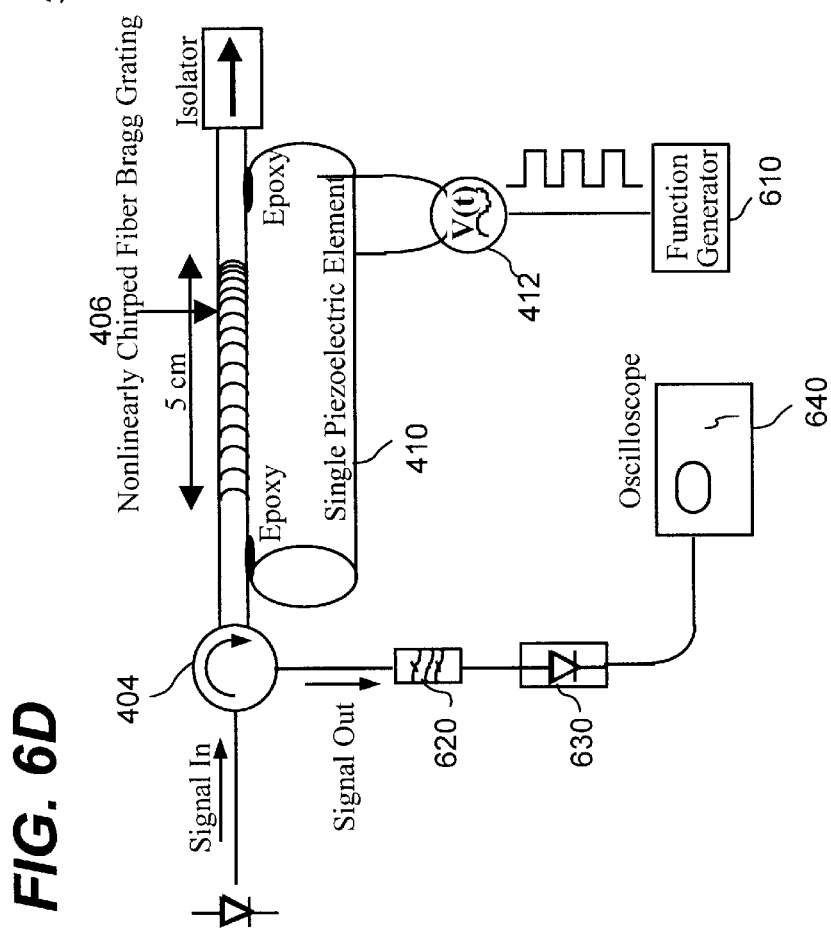
*FIG. 6D*

TUNABLE NONLINEARLY CHIRPED GRATING

This application claims the benefit of U.S. Provisional Application Ser. No. 60/069,498 filed on Dec. 15, 1997, which is incorporated herein by reference.

FIELD OF THE INVENTION

The present invention relates to optical dispersion compensation and optical pulse manipulation, and more specifically, to devices and systems having an optical grating capable of causing wavelength-dependent delays.

BACKGROUND OF THE INVENTION

Many optical materials exhibit different responses to optical waves of different wavelengths. One well-known phenomenon is chromatic dispersion, often simply referred to as "dispersion", in which the index of the refraction of a medium is dependent on the wavelength of an optical wave. Dispersion can cause optical waves of different wavelengths to travel at different speeds in a given medium, since the speed of light is dependent on the index of refraction.

Dispersion of optical materials in general relates nonlinearly to the wavelength. Group velocity is often used to characterize the dispersion. Group velocity is related to the derivative with respect to frequency of the propagation constant of an optical wave in a medium. The first-order group velocity dispersion is typically expressed as a change in light propagation time over a unit length of fiber with respect to a change in light wavelength. For conventional fibers in telecommunication, the first-order group velocity dispersion is on the order of 10 ps/nm/km at 1550 nm.

In many applications, an optical signal is composed of spectral components of different wavelengths. For example, a single-frequency optical carrier may be modulated in order to impose information on the carrier. Such modulation generates modulation sidebands at different frequencies from the carrier frequency. For another example, optical pulses, which are widely used in optical data processing and communication applications, contain spectral components in a certain spectral range. The dispersion effect may cause adverse effects on the signal due to the different delays on the different spectral components.

Dispersion in particular presents obstacles to increasing system data rates and transmission distances without signal repeaters in either single-channel or wavelength-division-multiplexed ("WDM") fiber communication systems. Data transmission rates up to 10 Gbit/s or higher may be needed in order to meet the increasing demand in the marketplace. Dispersion can be accumulated over distance to induce pulse broadening or spread. Two adjacent pulses in a pulse train thus may overlap with each other at a high data rate due to dispersion. Such pulse overlapping can often cause errors in data transmission.

The dispersion effect in fiber systems can be significantly reduced by using an optical carrier of a narrow linewidth at or near a zero-dispersion wavelength of the fiber. For example, fiber systems operating near 1.3 μm with single-mode DFB lasers as light sources may be used for this purpose.

Alternatively, the dispersion may be compensated by using dispersion compensating elements. This can be accomplished by, for example, implementing a dispersion-compensating fiber ("DCF") to introduce dispersion with an opposite sign to the accumulated dispersion in a fiber link. Typically, a DCF may be many times more dispersive than a conventional fiber (e.g., a factor of 5 to 10). One DCF-compensated system is described by Nuyts et al. in "Performance improvement of 10 Gb/s standard fiber transmission systems by using SPM effect in the dispersion compensated fiber," *IEEE Photon. Tech. Lett.* 8, pp. 1406–1408 (1996).

Another approach to compensating for dispersion uses a fiber grating with linearly chirped grating periods. See, for example, Loh et al., "10 Gb/s transmission over 700 km of standard single-mode fiber with 10-cm chirped fiber grating compensator and duobinary transmitter," *IEEE Photon. Tech. Lett.* 8, 1258–1260 (1996). A spectral component in an optical signal with a wavelength satisfying a Bragg phase-matching condition is reflected back from the fiber grating. Other spectral components are transmitted through the grating. The Bragg phase-matching conditions at different positions in the fiber grating are differentiated by chirping the grating period.

The resonant wavelength of the fiber grating changes with the position. As the grating period increases or decreases along a direction in the fiber grating, the resonant wavelength increases or decreases accordingly. Therefore, different spectral components in an optical signal are reflected back at different locations and have different delays. Such wavelength-dependent delays can be used to negate the accumulated dispersion in a fiber link.

A fiber grating with a uniform period may also be used to produce different delays in the reflected waves at different locations for compensating the dispersion. Ohn et al. report a use of 21 stretching piezo segments to cause nonuniform stretching in a uniform fiber grating in "Dispersion variable fibre Bragg grating using a piezoelectric stack," *Electron. Lett.* 32, pp. 2000–2001 (1996). Since segments of the fiber grating can be stretched by different amounts, different delays for different spectral components at different positions in the fiber can be produced to compensate for dispersion.

SUMMARY OF THE INVENTION

The present disclosure describes a nonlinearly chirped grating having a mechanism to adjust the Bragg phase-matching conditions. The dispersion of such a nonlinearly chirped grating can be dynamically varied to produce a desired dispersion with desired relative delays among different spectral components in a controllable manner.

One embodiment of the invention includes a grating that has a nonlinearly chirped grating period. The grating is made of a mechanically stretchable or compressible material. A transducer is engaged to the grating to uniformly change the overall length of the grating along the direction of the grating vector in response to a control electrical signal. Compression or expansion of the grating provides a spectral shift in the operating spectral range. The nonlinear chirping causes the relative delays of different spectral components at different wavelengths to be changed with the overall length of the grating. The transducer can be controlled to compress or stretch the overall length of the grating in order to produce a tunable dispersion profile.

One implementation of the transducer includes a piezoelectric element. An external voltage control signal is applied to the piezoelectric element to vary the length of the nonlinearly chirped grating.

Another implementation uses a magnetostrictive element to change the grating length according to an external control magnetic field.

Another embodiment of the invention includes a grating with a uniform grating period and a nonlinearly chirped effective index of refraction along the grating direction. The grating material is responsive to a spatially-varying external control field such as an electric field, an electromagnetic radiation field, or a temperature field along the grating direction so that the nonlinear chirp of the effective index of refraction can be adjusted to change relative delays of different spectral components and to produce a tunable dispersion profile.

Yet another embodiment is a grating that has a nonlinearly chirped grating period and an externally adjustable spatial profile in the effective index of refraction along the grating direction. The overall length and the effective index of refraction of the grating can be individually adjusted to change the relative delays of different spectral components and to shift the operating spectral range of the grating.

However constructed, the frequency response of a nonlinearly chirped grating may be tuned by using an acoustic wave propagating along the grating direction. The acoustic wave induces additional modulation sidebands in the frequency response of the grating. Such modulation sidebands are displaced from the baseband by a frequency spacing that is dependent on the frequency of the acoustic wave. Therefore, an adjustable dispersion can be achieved by tuning the frequency of the acoustic wave.

One aspect of the invention is dispersion compensation. A nonlinear chirped grating in accordance with the invention can be disposed at a fiber link to reduce the effects of the dispersion. The dispersion produced by such a grating is actively tunable to compensate for varying dispersion in a fiber link which includes a dispersion analyzer and a feedback control. This tunability can be advantageously used in a dynamic fiber network in which communication traffic patterns may change over time. For example, a given channel may be originated at different locations in the network from time to time so that the accumulated dispersion of that given channel in a specific fiber link is a variable. Therefore, the dispersion compensation required for that fiber link needs to change accordingly. Also, the operating conditions for point-to-point transmission may also change, resulting in variations in the accumulated dispersion for signals in a fixed fiber link.

Another aspect of the invention is chirp cancellation in directly modulated semiconductor lasers. A nonlinear chirped grating in accordance with the invention can be used to produce a complementary chirp in a laser pulse with respect to the modulation-induced chirp to effect a chirp cancellation. The tunability of the grating allows for chirp cancellation for different modulation signals which cause different frequency chirp profiles in the laser output.

A further aspect of the invention is adjustable pulse shaping in which the nonlinear chirped dispersion is used to compress or stretch an optical pulse to a desired pulse profile.

These and other embodiments, aspects and advantages of the invention will become more apparent in light of the following detailed description, including the accompanying drawings and appended claims.

BRIEF DESCRIPTION OF THE DRAWINGS

FIG. 6D is a diagram of a modulated nonlinearly chirped fiber grating.

FIG. 6E is a chart showing a modulated voltage signal used in FIG. 6D.

FIG. 6F is a chart showing reflected output signals as a function of time at different modulation frequencies.

DETAILED DESCRIPTION OF THE INVENTION

Figure 1:
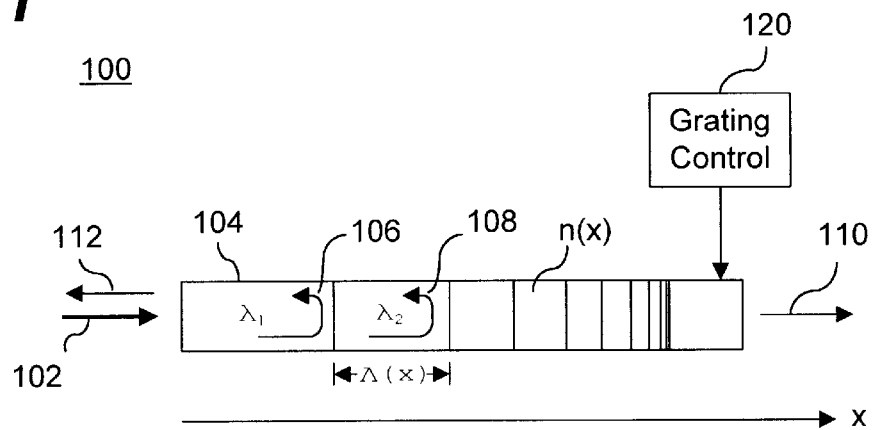
FIG. 1 is a diagram illustrating a nonlinear chirped grating in a wave-guiding element.

FIG. 1 shows a nonlinearly chirped grating 100 in accordance with one embodiment the invention. The grating 100 is formed of an optical wave-guiding element 104 such as a fiber or waveguide. The grating period, $\Lambda(x)$, and the effective index of refraction in the grating, $n(x)$, are at least partly dependent on the position, x, along the wave-guiding element 104. An input optical signal 102 enters the grating 104 at a nearly normal incidence to produce a reflected signal 112 and a transmitted signal 110.

A spectral component of a wavelength $\lambda$ in the input optical signal 102 is reflected back at position x when the wavelength $\lambda$, the grating period $\Lambda(x)$, and the effective index of refraction $n(x)$ satisfy a Bragg phase-matching condition:

$$2n(x)\Lambda(x)=\lambda.$$

Therefore, the wavelength $\lambda$ of the reflected wave varies with the position x according to the grating parameter $n(x)\Lambda(x)$. Different spectral components of different wavelengths are reflected at different locations and have different phase delays. For example, when the grating parameter $n(x)\Lambda(x)$ increases with x, spectral components at short wavelengths satisfying the phase-matching condition are reflected back at locations before the components at long wavelengths. A spectral component in the input signal 102 that does not meet the above Bragg phase-matching condition transmits through the wave-guiding element 104 as indicated by a signal 110. The grating parameter $n(x)\Lambda(x)$ determines the spectral range of the reflected signal from the grating 100. This forms the basis of dispersion compensation and pulse shaping.

The grating 100 is generally configured to have a nonlinearly chirped grating parameter $n(x)\Lambda(x)$, i.e., $n(x)\Lambda(x)$ changes nonlinearly with the position x. This may be achieved by a nonlinearly chirped $n(x)$, $\Lambda(x)$ or a combination of both.

The grating 100 can be adjusted to change the reflection spectrum and the relative delays in the different reflected spectral components. A grating control 120 is implemented to control the grating parameter $n(x)\Lambda(x)$ by varying at least one of $n(x)$ and $\Lambda(x)$ of the grating 100. This provides a dynamically tunable reflection spectral range and relative delays of different reflected spectral components.

Figure 2:
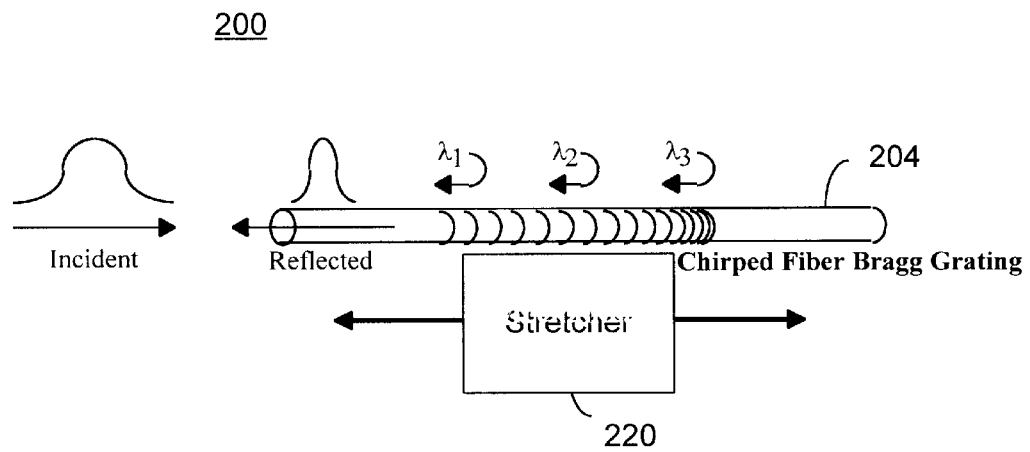
FIG. 2 is a diagram showing a grating having a nonlinearly chirped grating period.

FIG. 2 shows one implementation 200 of the nonlinearly chirped grating 100. A fiber grating 204 has a constant effective index of refraction $n(x)=n$ and a nonlinearly chirped grating period $\Lambda(x)$. Thus, a phase-matched wavelength changes with the position x according to $\Lambda(x)$ only. A fiber stretcher 220 is engaged to the fiber grating 204 to change the overall length of the grating 204. This provides a control in the reflection spectrum and the relative delays in different spectral components.

Figure 3A:
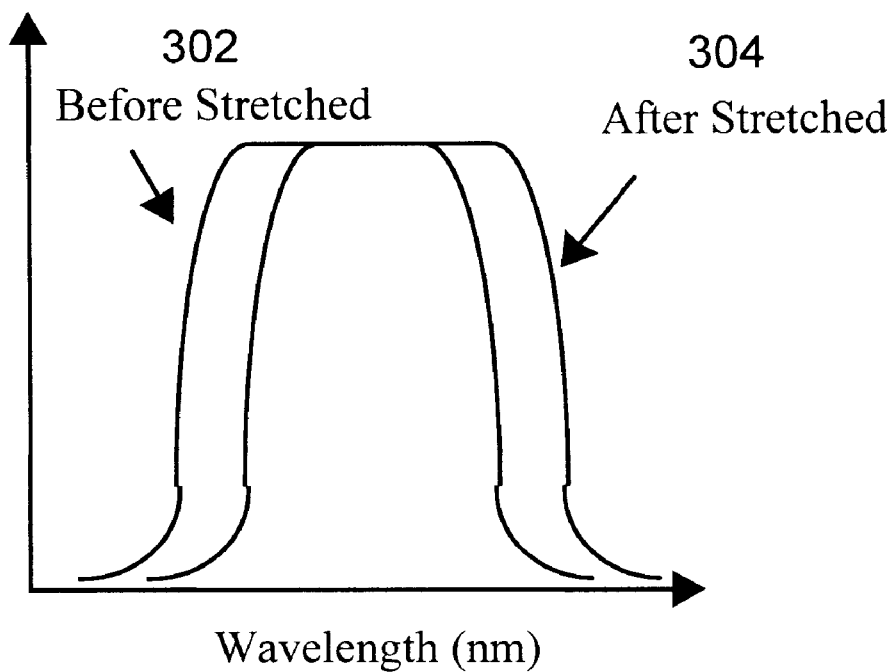
FIG. 3A is a chart showing shift of reflective spectrum of a nonlinearly chirped fiber grating due to fiber stretching.

When the fiber grating 204 is stretched, each grating pitch increases. Accordingly, a phase-matched wavelength at each grating position increases. Therefore, the reflection spectrum shifts towards longer wavelengths. This effect is illustrated in FIG. 3A in which curves 302 and 304 respectively represent the reflection spectral profiles before and after the fiber stretching.

Since the grating period $\Lambda(x)$ is nonlinearly chirped, the delay of the reflected spectral components also has a nonlinear dependence on the position x. In addition, a change in the overall fiber length produces different changes in $\Lambda(x)$ at different positions along the fiber grating 204. This produces different relative delays for different wavelengths that satisfy the Bragg phase-matching condition. Such an effect can be used to produce tunable dispersion compensation profiles.

Figure 3B:
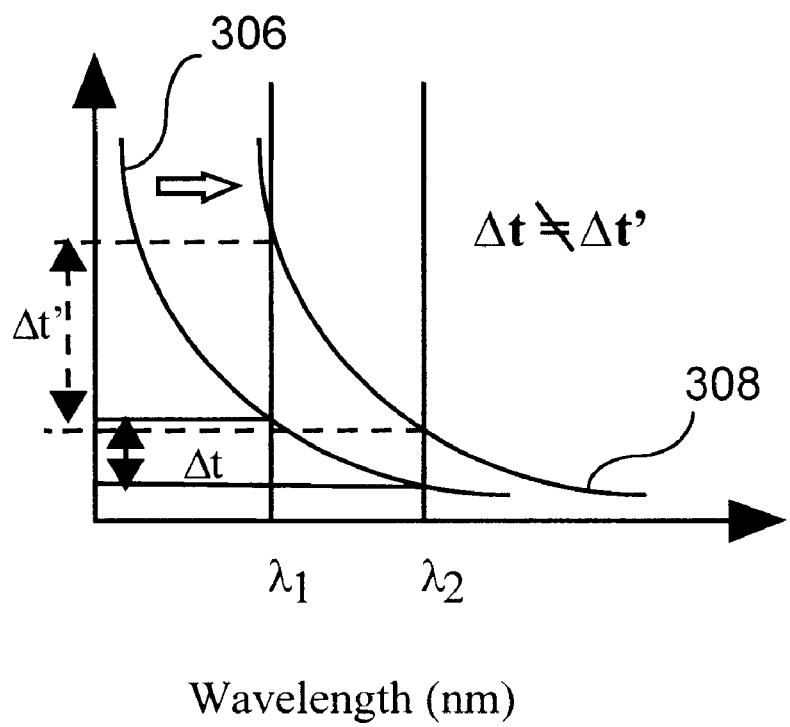
FIG. 3B is a chart showing relative time delay of reflected signals at two different wavelengths due to fiber stretching.

FIG. 3B is a chart of the relative time delays of two wavelengths before and after the fiber stretching. Curve 306 represents the time delay as a function of wavelength before the fiber stretching. Two different wavelengths $\lambda_1$ and $\lambda_2$ have a relative time delay $\Delta t$ with respect to each other. After the fiber grating is stretched, the time delays of both wavelengths increase (curve 308) and the relative time delay $\Delta t'$ is in general different from $\Delta t$. In the example shown, the relative time delay $\Delta t'$ increases.

Referring to FIG. 2, any device capable of stretching the grating 204 may be used as the stretcher 220. For example, a piezoelectric element or a magnetostrictive element may be used to produce a control over the length of the grating 204 according to an external electrical voltage or a magnetic field. Piezoelectric and magnetostrictive transducers are well known and will not be described here.

A technique of using a magnetostrictive rod to stretch a fiber in a non-uniform magnetic field is disclosed by Cruz et al. in "Fibre Bragg gratings tuned and chirped using magnetic fields," Electronics Letters, Vol. 33(3), pp. 235–236 (1997), which is incorporated herein by reference. This technique can be used in the embodiment 200 of FIG. 2 to adjust the grating length. In particular, since the fiber grating 204 is nonlinearly chirped, a uniform magnetic field, rather than a gradient magnetic field, can be used to uniformly stretch the fiber grating 204 for tuning the dispersion response.

Figure 4:
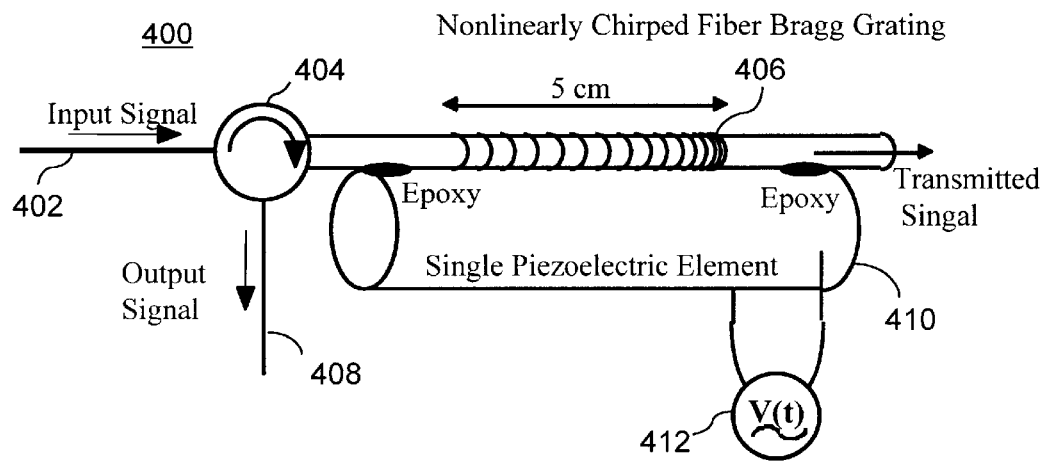
FIG. 4 is a diagram of one implementation of the system in FIG. 2 using a piezoelectric element.

FIG. 4 shows an implementation of the embodiment 200 by using a piezoelectric element. Two ends of a piezo element 410 are respectively fixed at two sides of a nonlinearly chirped fiber grating 406 by, for example, using an adhesive such as epoxy. A voltage source 412 supplies a control voltage to the piezo element 410 to change the length of the piezo which in turn couples the strain to the fiber grating 204. An optical circulator 404 is used to couple an input optical signal 402 to the fiber grating 406 and to route the reflected signal 408. An optional optical isolator may be placed at the other end of the fiber grating 406 to reject any optical feedback signal.

The nonlinearly-chirped fiber grating 204 may be made by a near-UV technology that uses an interference pattern produced by a phase mask with a light beam at 300 nm. The absorption of light in the fiber core at the wavelength of 300 nm is sufficiently small to avoid damage to the core-cladding interface in the fiber. A photosensitive fiber (e.g., the type manufactured by QPS Technology) is first soaked in a high-pressure molecular hydrogen chamber under about 250 atm pressure at ~60° C. for approximately 2 days to give the core an estimated hydrogen concentration of about 2.5 mol. %.

Figure 5:
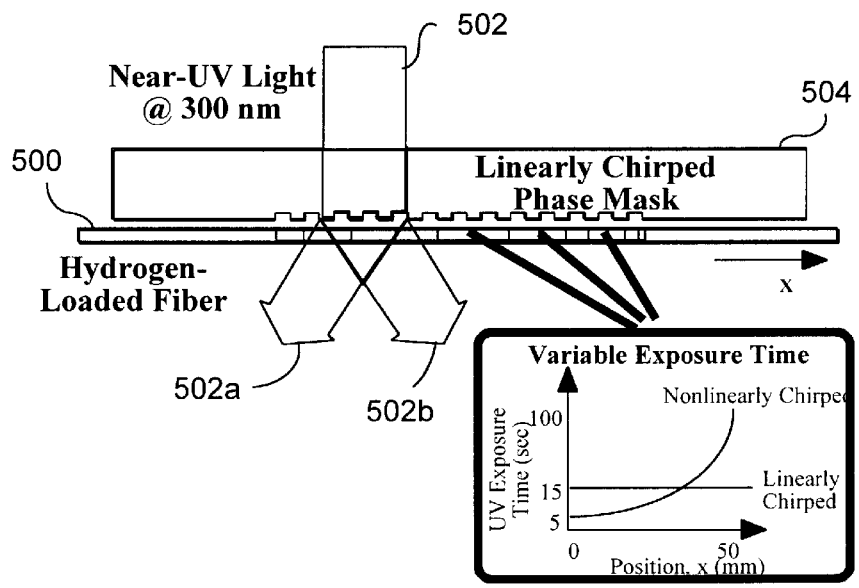
FIG. 5 is a schematic illustration of one approach to form a nonlinearly chirped grating in a photosensitive fiber.

FIG. 5 illustrates the formation of the nonlinearly-chirped grating 204 in a hydrogen-loaded photosensitive fiber 500. A light beam 502 from a UV argon laser operating on a group of spectral lines near 300 nm is focused through a 50-mm long linearly-chirped phase mask 504 onto the fiber core at an intensity of about 200 W/cm$^2$. Two first-order diffraction beams 502a and 502b interfere with each other to form an interference pattern in the immediate vicinity of the phase mask 504 where the fiber core is located. Each 1-mm spot on the fiber 500 is exposed for time periods ranging from 5 to 100 sec. After each exposure, the fiber 500 and mask 504 are translated by 1 mm relative to the UV light beam 502 and the process is repeated. The variable exposure time induces the nonlinear chirp as shown in the insert of FIG. 5.

Figure 6A:
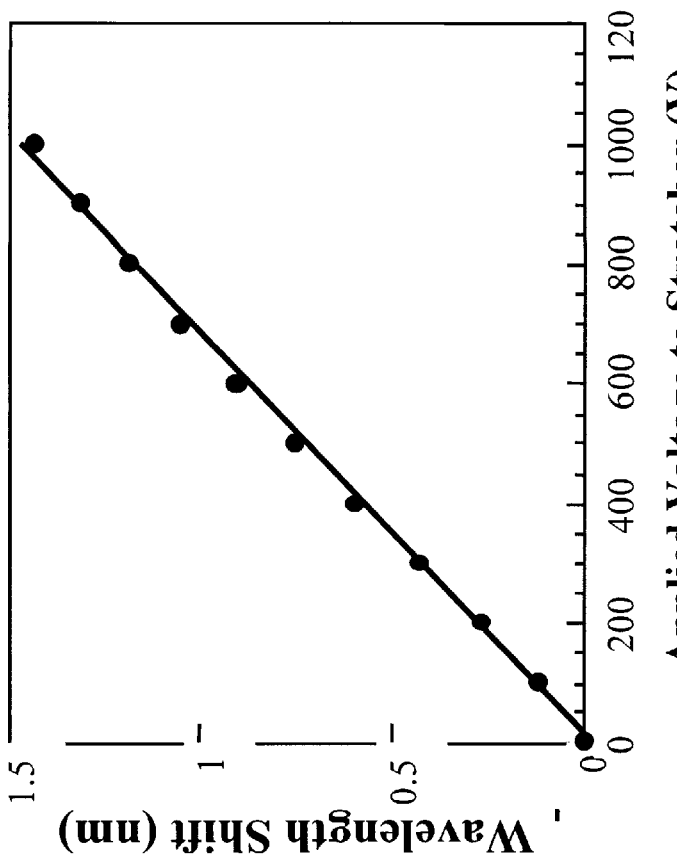
FIG. 6A is a chart showing measured wavelength shift in the reflected signals due to fiber stretching in the system of FIG. 4.
Figure 6B:
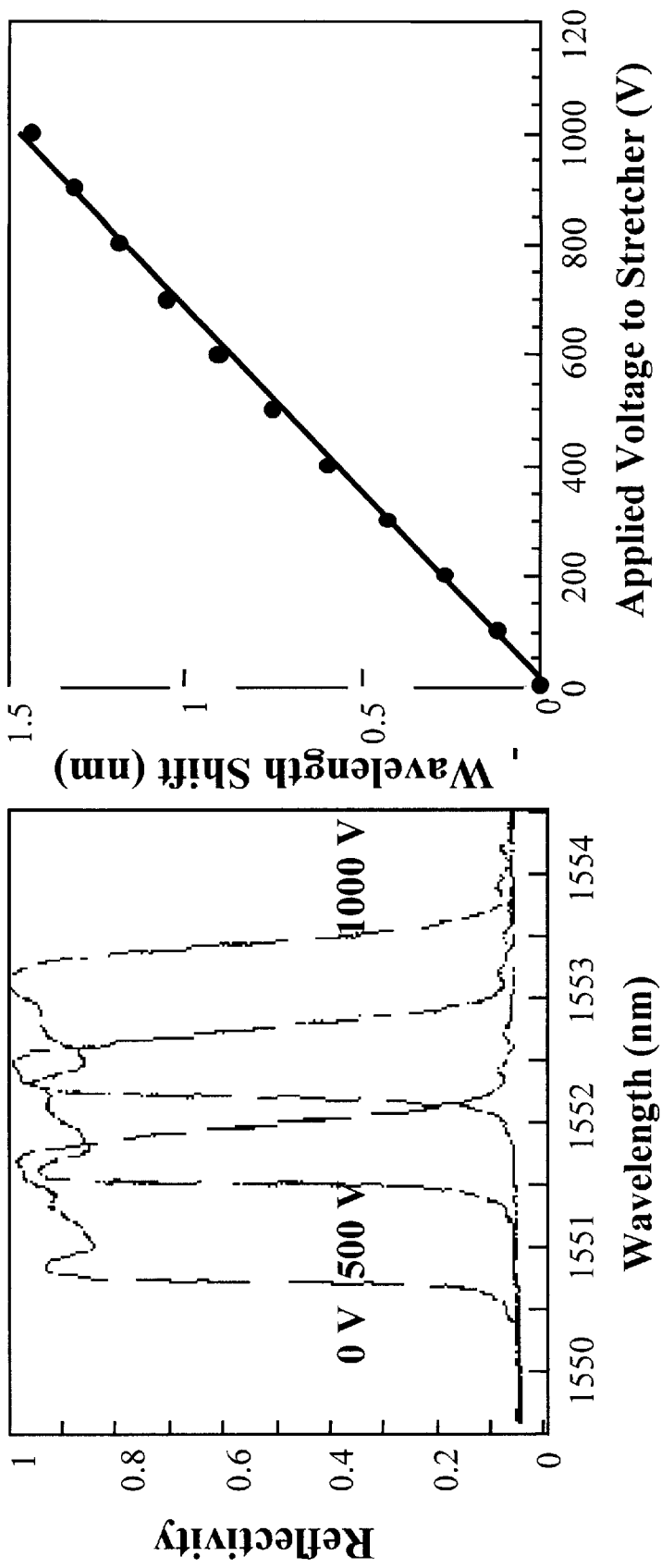
FIG. 6B is a chart showing measured shift of the reflection spectrum in the system of FIG. 4.

FIG. 6A shows the measured wavelength shift in the reflected signal 408 as a function of the control voltage applied to the piezo element 410. FIG. 6B shows the reflection spectrum shifts due to fiber stretching for voltages on the piezo element 410 at 500 V and 1000 V, respectively. When a control voltage of about 1000 V is applied to the piezo element 410, the reflected band is shifted by about 1.5 nm, and the wavelength shift is linear with respect to the voltage. The bandwidth is about 1 nm and the reflectivity varies from 85% to 100%, i.e. by approximately 0.7 dB. The dispersion varies nonlinearly and smoothly from 300 ps/nm to 1000 ps/nm. While increasing the applied voltages, the time delay curves shift to longer wavelengths without distorting the smooth shape. Therefore, for a given transmitted channel wavelength, the channel will encounter a different dispersion compensation corresponding to different stretching of the nonlinearly-chirped fiber grating.

Figure 6C:
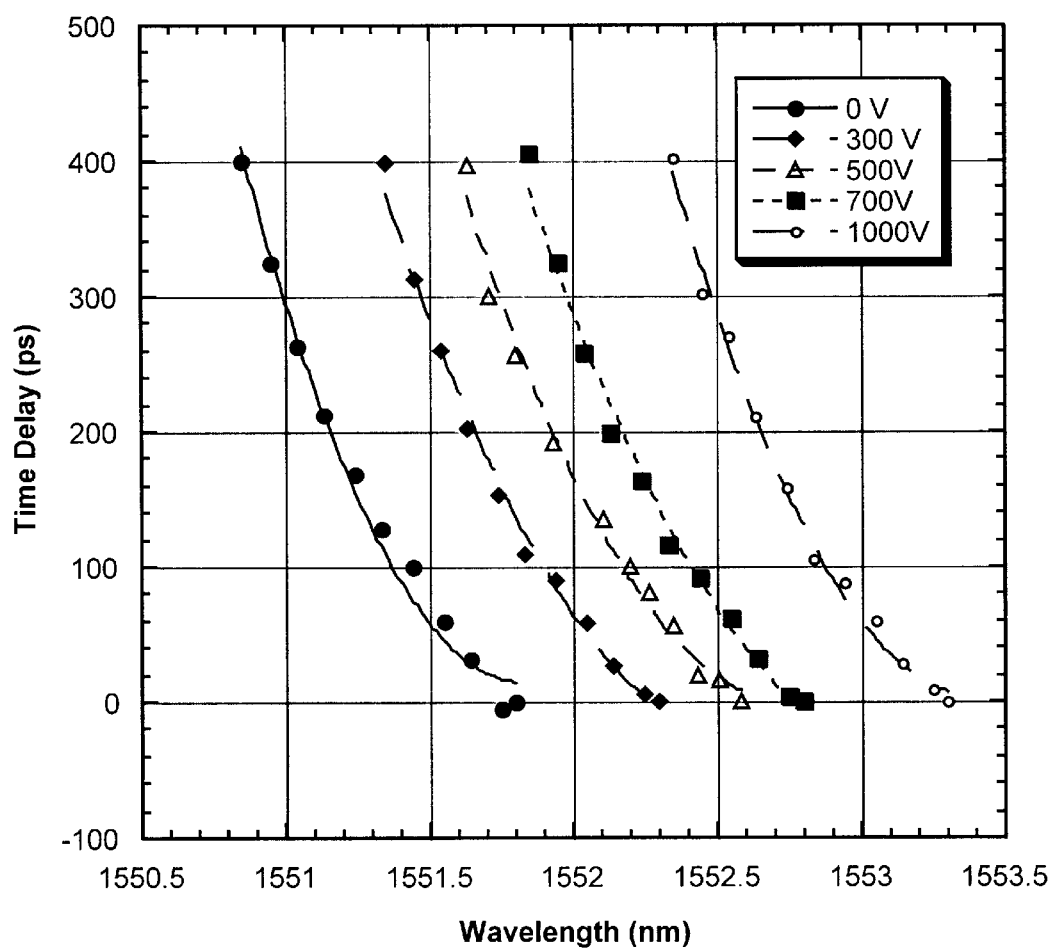
FIG. 6C is a chart showing nonlinear time delays of reflected signals as a function of wavelengths that are measured in the fiber grating of FIG. 4.

FIG. 6C further shows measured nonlinear time delays of reflected signals as a function of wavelengths when the fiber grating is stretched by different amounts under different control voltages.

The length of the piezoelectric element 410 can be modulated to provide dispersion switching. FIG. 6D shows a system using the fiber grating 400 to produce a signal with a modulated dispersion. A modulation signal generator 610 modulates the piezo control 412 so that the length of the fiber grating 406 is modulated. A bandpass interference filter 620 with a bandwidth of 0.3 nm is used to filter the reflected output from the fiber grating 406. A photodetector 630 receives the transmitted signal from the filter 620. An oscilloscope 640 receives and displays the time response of the signal from the photodetector 630.

FIG. 6E shows the modulated control voltage applied to the piezo element 410. Measurements at modulation frequencies at 10 Hz, 50 Hz, 100 Hz, and 250 Hz are shown in FIG. 6F. The piezoelectric element 410 may be modulated up to about 100 Hz using 0–500 Volts modulation. The upper limit of the frequency response is limited by the characteristics of the PZT. With this dynamic response, dispersion compensation in less than 10 ms can be achieved in circuit-switched optical networks.

Figure 7:
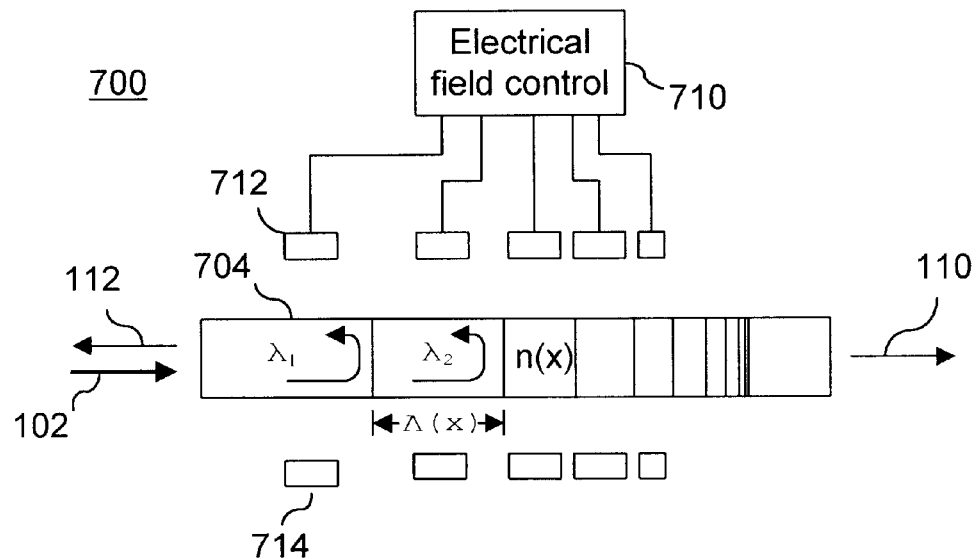
FIG. 7 is a diagram showing a nonlinearly chirped grating based on electro-optic effects.

The nonlinearly chirped grating 100 in FIG. 1 can also be implemented by using a wave-guiding element that has an index of refraction dependent on an external electrical field. One example of such wave-guiding element is a dielectric waveguide or fiber exhibiting electro-optic effects. $LiNbO_3$ is a commonly used electro-optic material. FIG. 7 shows a grating 700 with a nonlinearly chirped grating period in such a wave-guiding element 704. The effective index of refraction n(x) of the wave-guiding element 704 varies with an electrical field. A series of pairs of electrodes 712, 714 are disposed along the waveguiding element 704 to produce adjustable local fields. An electrical-field control module 710 controls the spatial variation of the field to produce a desired nonlinear chirped n(x) and to adjust the dispersion.

Figure 8:
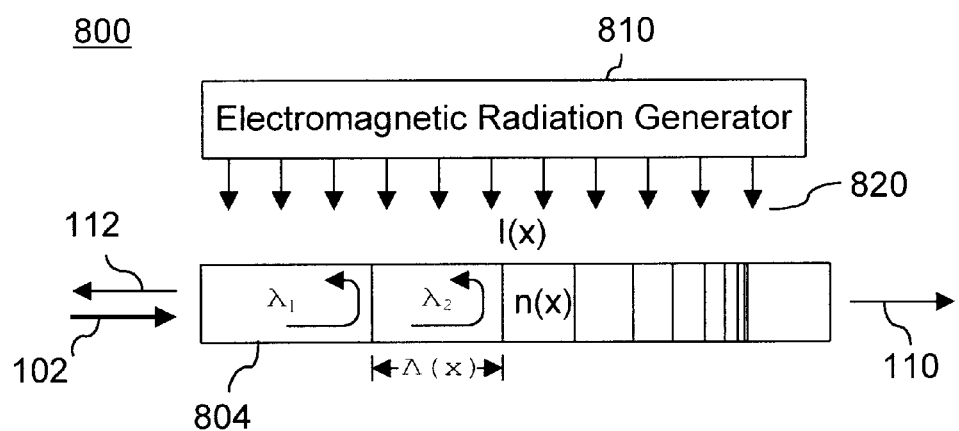
FIG. 8 is a diagram showing a photosensitive nonlinearly chirped grating.

FIG. 8 shows another embodiment 800 that uses an electromagnetic radiation to control the spatial variation of the refractive index n(x) of a wave-guiding element 804. The wave-guiding element 804 responds to the radiation field 802 and has a field-dependent index n(x). For example, photosensitive materials such photorefractive crystals and polymers may be used to implement the present invention. The nonlinear chirping of the index n(x) is formed by applying an electromagnetic radiation field 820 with a nonlinear intensity distribution along the grating. A radiation generator 810 is configured to control the intensity variation I(x) of the field 820. In the optical frequency range, the radiation generator 810 may be a laser.

Figure 9:
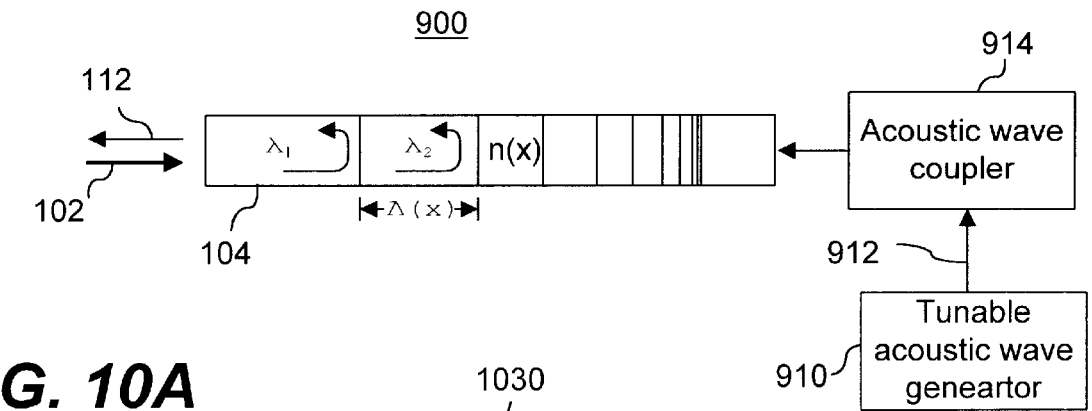
FIG. 9 is a diagram showing a nonlinearly chirped grating having an acoustic tuning element.

It is further contemplated that an acoustic wave can be used to modulate the response of any of the above nonlinearly chirped gratings for tuning the output frequency. FIG. 9 shows a nonlinearly chirped grating 900 with such an acoustic tuning mechanism. An acoustic wave generator 910 produces a tunable acoustic wave 912. An acoustic wave coupler 914, such as an acoustic focusing horn, couples the acoustic wave into the grating 104.

In operation, the acoustic wave interacts with the grating and induces two additional narrow-band peaks on either side of the base band produced by the Bragg resonance condition. The frequency components in either sideband has the same relative delays as in the baseband but are shifted from the baseband in frequency by a specified amount. This frequency shift is dependent on the frequency of the acoustic wave. Thus, the frequency of a sideband is adjustable by changing the frequency of the acoustic wave. Liu et al. disclose such a technique in "Improved Efficiency Narrow-Band Acoustooptic Tunable Reflector using Fibre Bragg grating," post deadline paper PD4, Annual Meeting of Optical Society of America, "Bragg Gratings, Photosensitivity, and Poling in Glass Fibers and Waveguides: Applications and Fundamentals," Oct. 26–28, 1997, Williamsburg, Va., which is incorporated herein by reference.

The nonlinearly chirped fiber gratings in accordance with the invention are tunable in two aspects. First, the frequency profile of the reflected and the transmitted signals can be shifted as desired. Second, the relative delays of different frequency components in an input pulse can be adjusted in a controllable manner. The first aspect of tunability is useful in multi-wavelength photonic systems such as wavelength-division multiplexed fiber communications systems. The second aspect of the tunability can be used for dynamic dispersion compensation in many dispersive optical systems, especially in fiber communication systems.

Figure 10A:
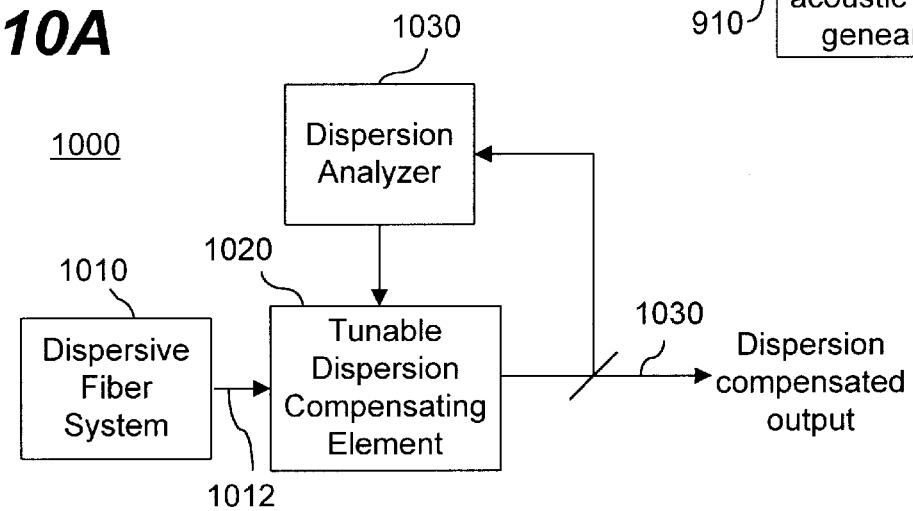
FIGS. 10A and 10B are block diagrams of two dynamically adjustable dispersion compensation systems.

FIG. 10A shows a fiber system 1000 having a tunable dispersion-compensating element 1020 in accordance with one embodiment the invention. The tunable dispersion element 1020 may be a nonlinearly chirped grating. A dispersive fiber system 1010 produces an optical signal 1012 with a certain amount of dispersion. A dispersion analyzer 1030 measures the amount and the sign of the accumulated dispersion in the output signal from the tunable dispersion compensating element 1020. The tunable dispersion-compensating element 1020 uses this information to adjust the dispersion compensation in such a way that the dispersion in the signal 112 is compensated. As the dispersion in the dispersive fiber system 1010 changes, the tunable dispersion-compensating element 1020 adjusts accordingly in response to the dispersion change to maintain the desired dispersion compensation in output 1030.

Figure 10B:
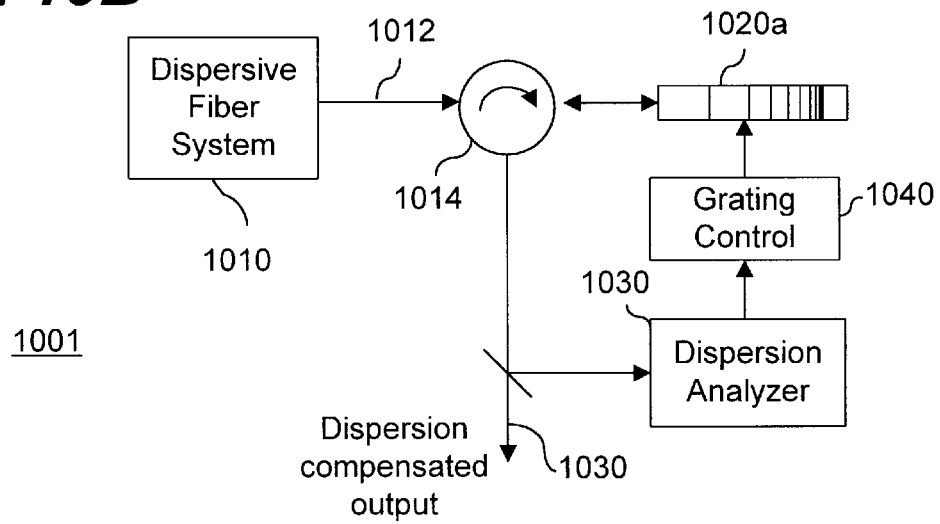

FIG. 10B is a block diagram for a fiber communication system 1001 that uses a nonlinearly chirped fiber grating 1020a to implement the system 1000 in FIG. 10A. A grating control 1040 adjusts the grating parameter n(x)Λ(x) in accordance with the control command from the dispersion analyzer 1030 to maintain the output 1030 properly compensated. The grating control 1040 may be any or a combination of the techniques shown in FIGS. 2, 7, and 8.

Figure 10C:
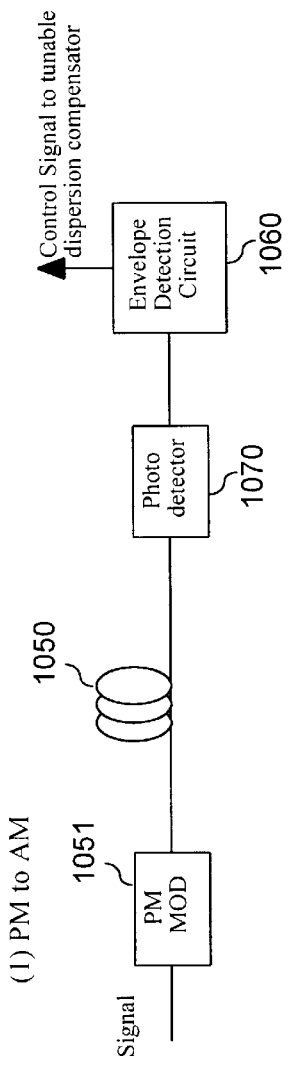
FIGS. 10C, 10D, and 10E are diagrams showing three exemplary implementations of the dispersion analyzer in FIGS. 10A and 10B.

The dispersion analyzer 1030 may be implemented in a number of ways. FIG. 10C shows a phase modulation to amplitude modulation dispersion detector. A phase modulator 1051 is disposed in the signal path to modulate the phase of the signal prior to transmission through a dispersive fiber 1050. An envelop detection circuit 1060 measures the converted amplitude modulation, whose amplitude corresponds to the relative accumulated dispersion, in the received signal by a photodetector 1070. More specifically, the polarity of dispersion can be detected by including the total dispersion of the group velocity dispersion in the fiber and the self-phase modulation caused by the fiber nonlinearity. See, Tomizawa et. al, "Nonlinear influence on PM-AM conversion measurement of group velocity dispersion in optical fiber," Electronics Letters, Vol. 30(17), pp. 1434–1435 (1994). The amplitude of the converted amplitude modulation is then used to determine the accumulated dispersion and to generate a control signal to the tunable dispersion compensation element.

Figure 10D:
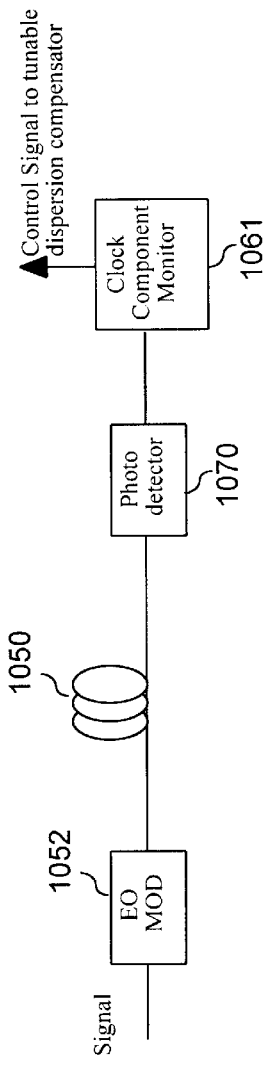

FIG. 10D shows another implementation of the dispersion analyzer 1030. An electro-optic modulator 1052 is disposed in the signal path to modulate the amplitude of the signal prior to transmission through the dispersive fiber 1050. The relative dispersion value can be determined by monitoring the amplitude of the clock component extracted from the signal after a square wave detection. This is done by a clock component monitor 1061. Since the dispersion broadens the signal pulses and reduces the amplitude of the signal, the magnitude of the clock component also decreases according to the broadening. Therefore, by adjusting the dispersion compensator to maximize the amplitude of the clock amplitude, the accumulated dispersion can be reduced or canceled.

Figure 10E:
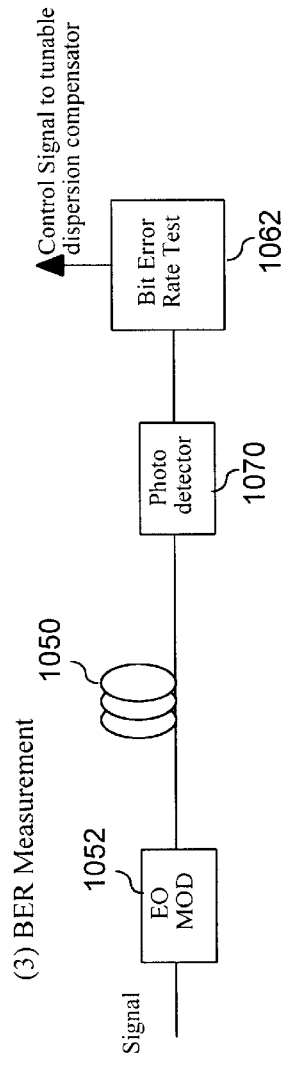

The dispersion analyzer 1030 can further be implemented by directly measuring the bit error rate of the signal passing through a dispersive fiber. This is shown in FIG. 10E. Since the dispersion can broaden the data pulses, the bit error rate ("BER") is degraded. A bit error rate testing device 1062 measures the bit error rate and extracts a relative information of the accumulated dispersion. With a feedback signal to the tunable dispersion compensator, the dispersion compensation can be adjusted to reduce or minimize the bit error rate.

Figure 11A:
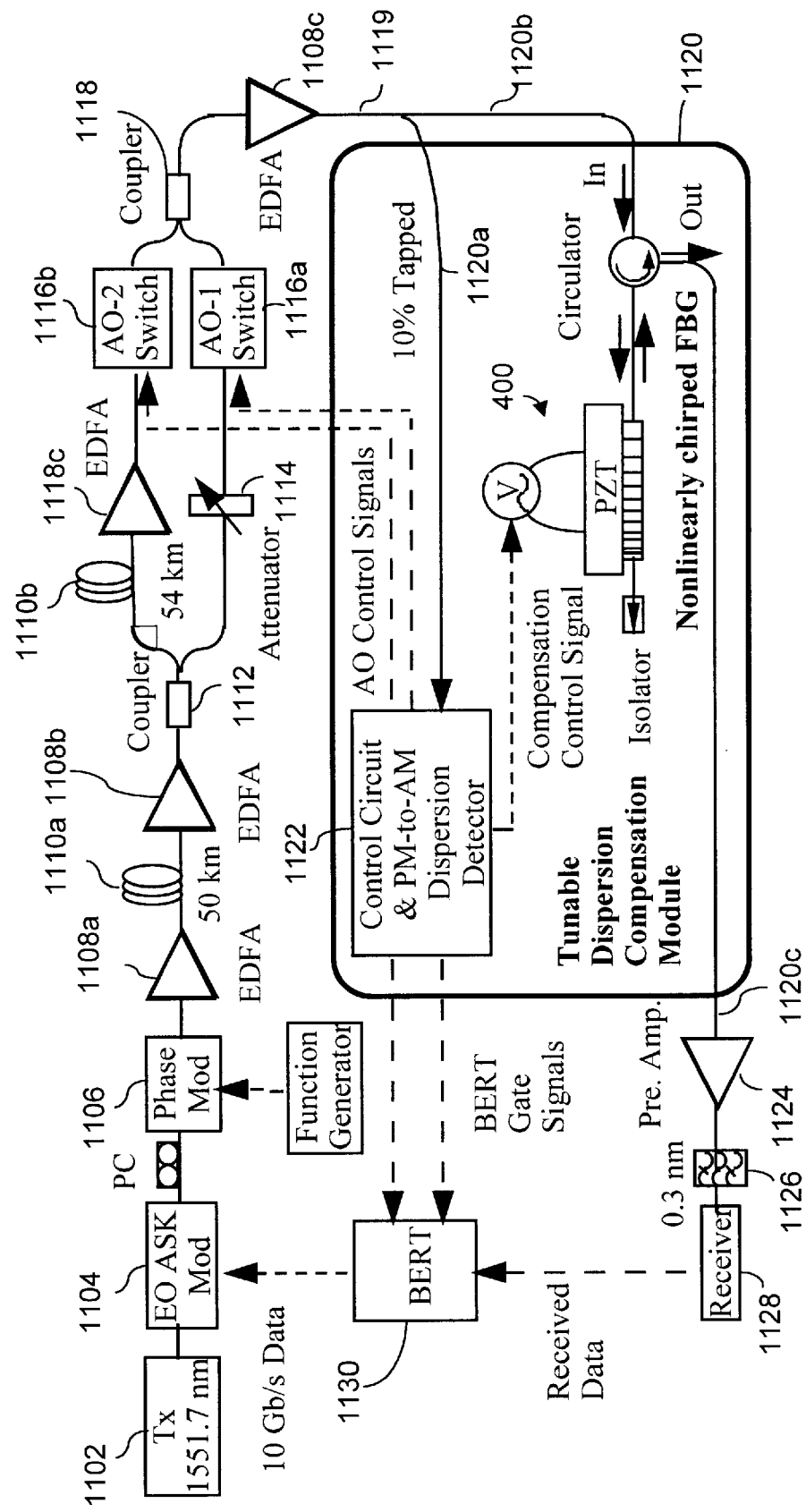
FIG. 11A is a block diagram of a fiber communication system based on the configuration in FIG. 10B using a nonlinearly chirped fiber grating.

FIG. 11A further shows a specific implementation of the dynamic fiber system 1001 in FIG. 10B. An electro-optic modulator imposes data on a laser beam at 10 Gbit/s. In addition, a phase modulator modulates the phase of the optical signal prior to transmission. A tunable dispersion compensator 1120 is based on a nonlinearly chirped fiber grating 400 as in FIG. 4. The signal path passing through the fiber loops 1110a, 1110b and acoustooptic switch 1116b is more dispersive than the signal path passing through the acoustooptic switch 1116a. Er-doped fiber amplifiers 1108a–c are used to maintain the signal strength above a specified level. The dispersion in the signal 1119 is detected by a dispersion analyzer 1122 by splitting a small portion of the signal 1119 (e.g., 10%). The majority of the signal 1119 is fed to the fiber grating 400 which produces a dispersion-compensated output 1120c.

The dispersion analyzer 1122 uses a PM-to-AM converter for measuring the dispersion. Due to the different group velocity dispersions of the different spectral components in the signal, the phase modulation is converted to amplitude modulation after the signal has traveled through a certain distance of fiber path. The accumulated dispersion is measured by the dispersion analyzer 1122. The dispersion analyzer 1122 further generates a corresponding control signal to the tunable fiber grating 400.

A bit error rate test 1130 is used to measure the bit error rate for evaluating the performance of the dispersion compensation module 1120. The output 1120c from the module 1120 is amplified and filtered by a bandpass filter 1126 with a bandwidth of 0.3 nm.

Figure 11B:
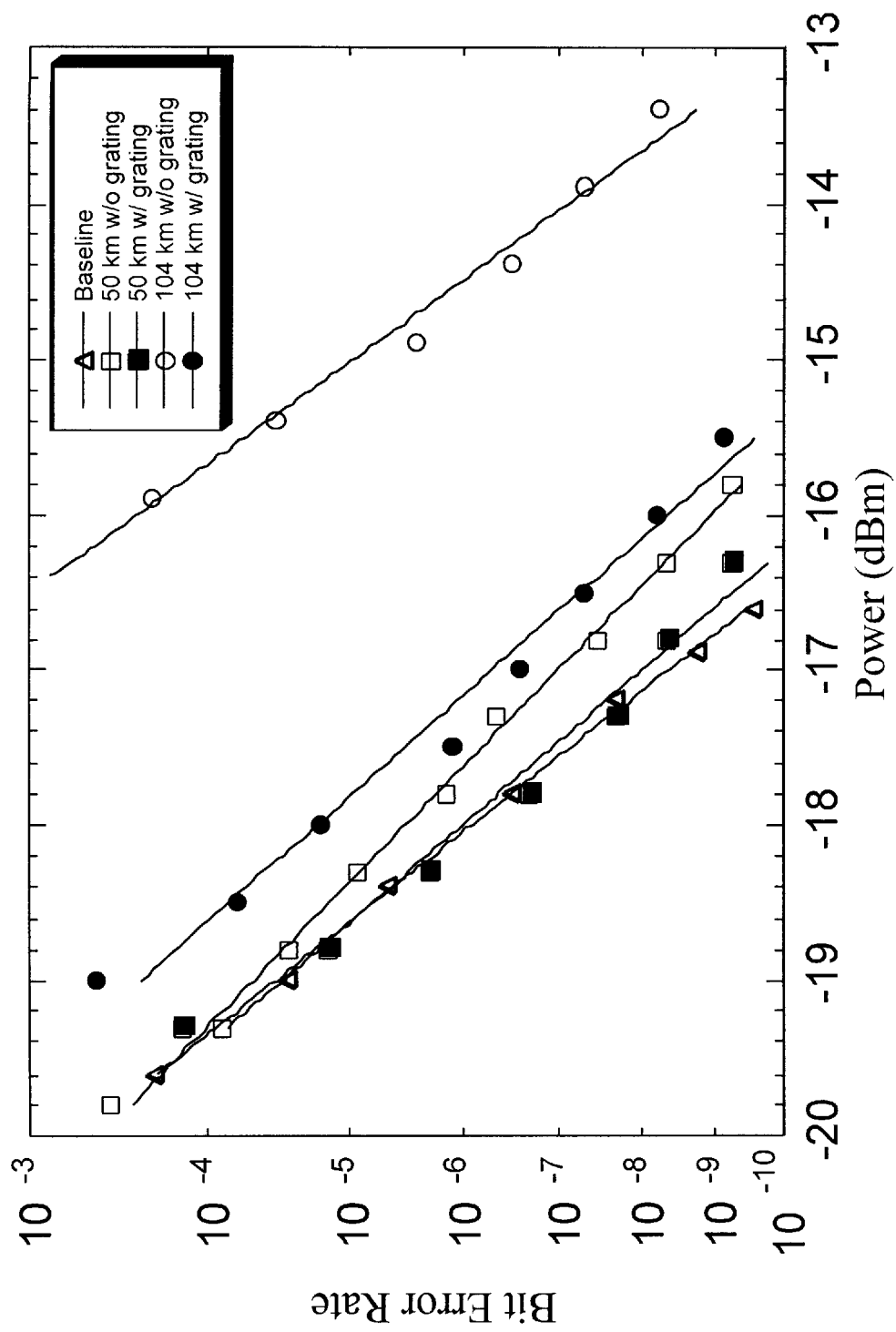
FIGS. 11B, 11C, and 11D are charts showing measured results of the system in FIG. 11A.
Figure 11C:
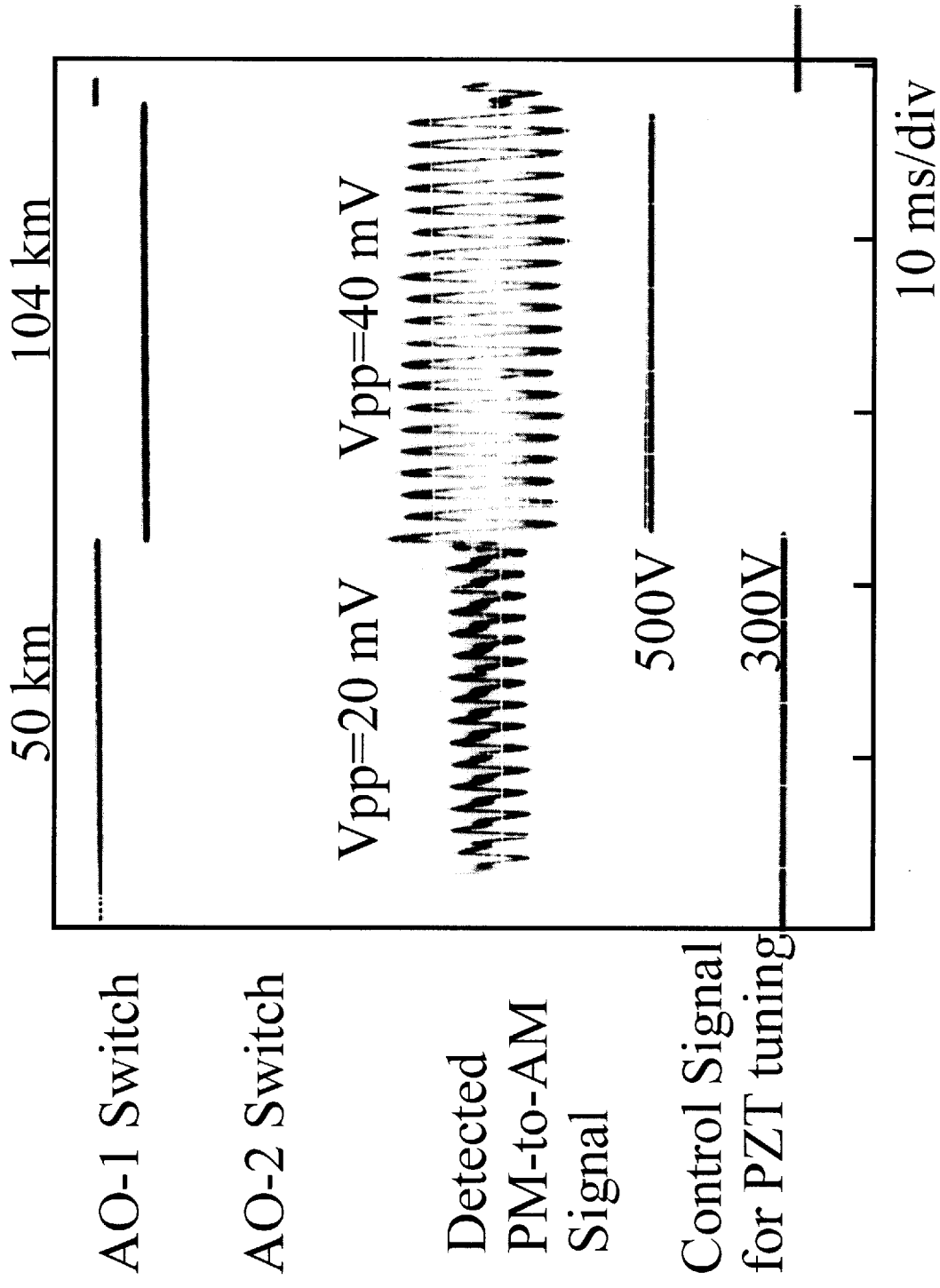
Figure 11D:
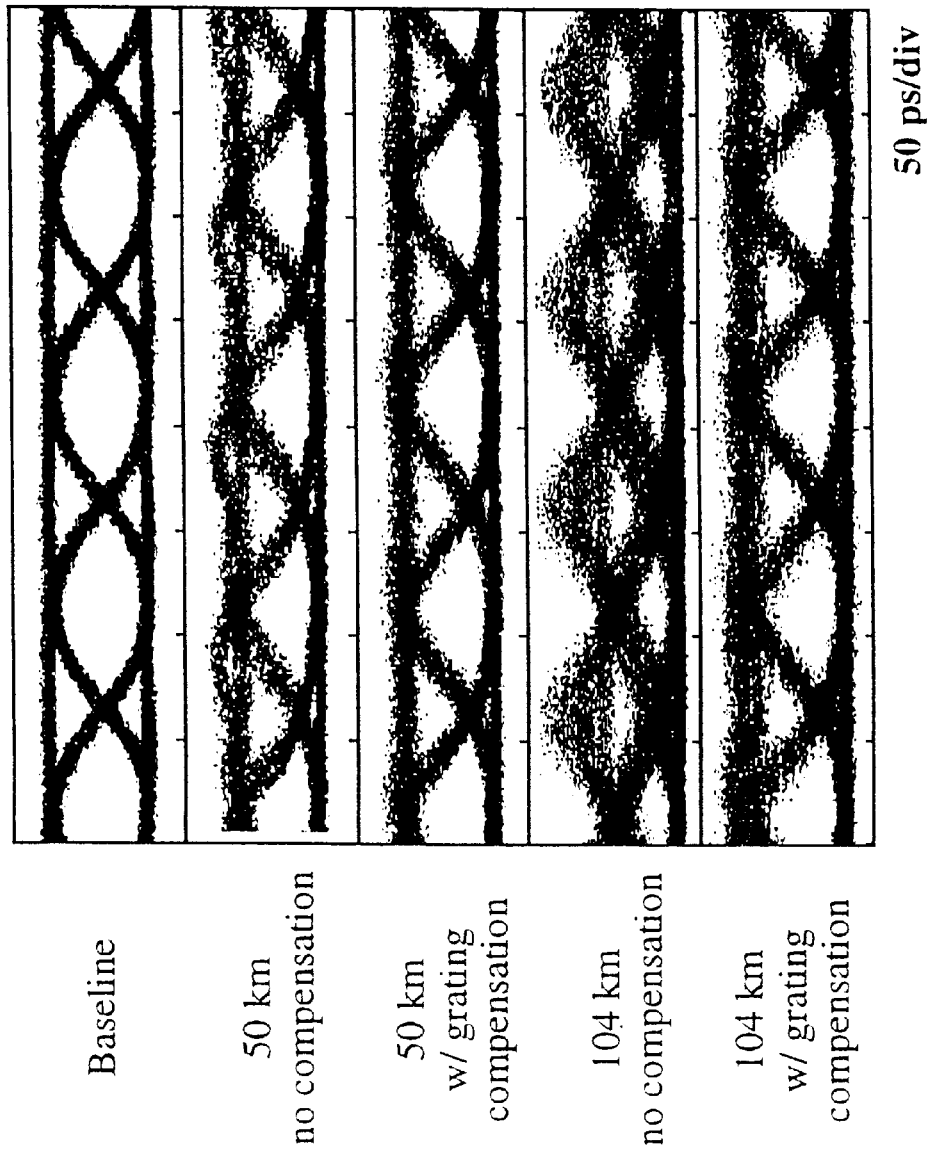

FIG. 11B shows measured results of the bit error rate as a function of the signal power in dBm. FIG. 11C shows how the control signal for the PZT tuning is generated in response to the dispersion levels of the input signals. FIG. 11D shows the measured eye diagrams indicating the significant improvements in the BER due to the dynamic dispersion compensation.

The above described nonlinearly chirped gratings may also be used in other applications such as chirp cancellation in directly modulated lasers and pulse shaping.

Figure 12:
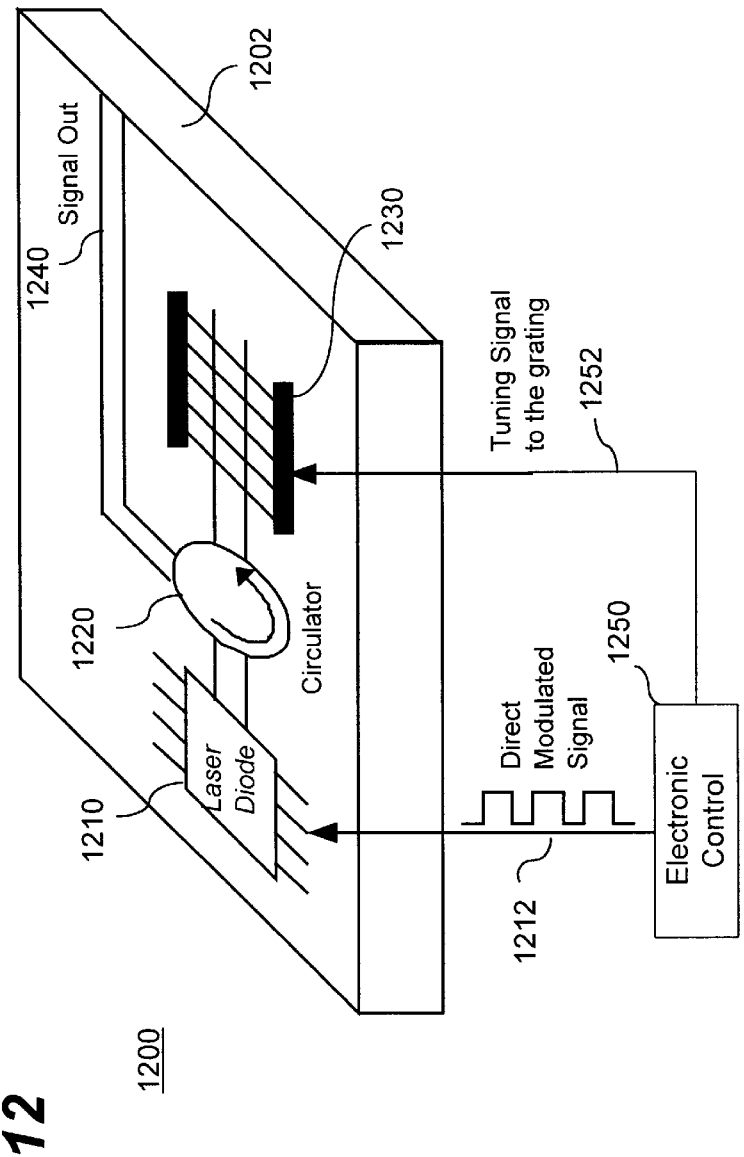
FIG. 12 is a diagram illustrating a semiconductor laser have a nonlinearly chirped waveguide grating for reducing modulation-induced frequency chirps in the laser output.

FIG. 12 shows an integrated semiconductor laser module 1200 having a nonlinearly chirped waveguide grating 1230 for reducing the modulation chirp. A laser diode 1210 is formed on a substrate 1202. A modulation signal 1212 is applied to the laser diode 1210 to modulate the driving current. Such direct modulation can cause frequency chirps in the output of the laser diode 1210. A nonlinearly chirped waveguide grating 1230 is formed on the substrate 1202 to produce a dispersion to reduce the frequency chirp.

The chirp in the laser output changes with the modulation frequency of the modulation signal 1212. The relation between the modulation frequency and the chirp in the laser output can be determined, e.g., by measurements. Based on this relation, a control circuit 1250 can be configured to generate a corresponding dispersion control signal 1252 to adjust the dispersion of the grating 1230.

Figure 13:
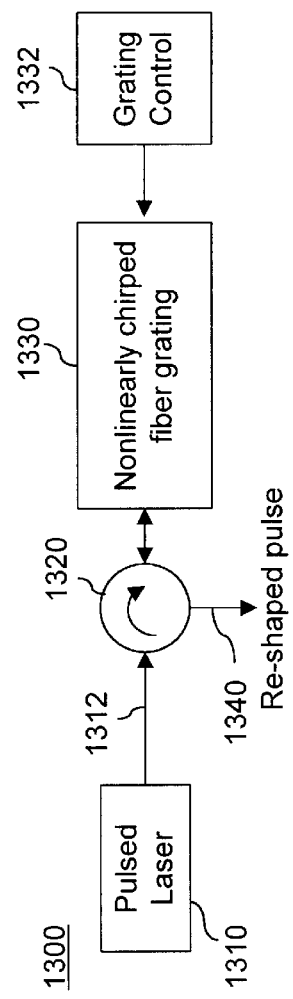
FIG. 13 is a diagram showing a pulse shaping system based on a nonlinearly chirped grating.

FIG. 13 further shows a block diagram of a system 1300 for pulse shaping. A nonlinearly chirped grating 1330 can produce a variable dispersion to an input pulse 1312 from a laser 1310 so that the output 1340 from the grating 1330 has a desired pulse shape.

Although the present invention has been described in detail with reference to a few embodiments, various modifications and enhancements may be made without departing from the scope and spirit of the following claims.

What is claimed is:

1. An optical device, comprising:
   a wave-guiding element having an optic axis to transport optical energy and an effective index of refraction along said optic axis; and
   an optical perturbation region formed in said wave-guiding element and configured to have a period along said optic axis,
   wherein a product of said period and said effective index of refraction is a nonlinear function of a position along said optic axis to effect a phase-matching condition such that a reflected optical wave from said optical perturbation region has a specified wavelength having a nonlinear dependence on a position along said optic axis.

2. A device as in claim 1, wherein said effective index of refraction changes along said optic axis.

3. A device as in claim 2, wherein said wave-guiding element is responsive to an electromagnetic radiation field and said effective index of refraction changes with said electromagnetic radiation field.

4. A device as in claim 3, wherein said wave-guiding element includes a photosensitive material and said electromagnetic radiation field has an intensity variation along said optic axis of said wave-guiding element.

5. A device as in claim 4, wherein said photosensitive material is a photorefractive material.

6. A device as in claim 2 wherein said wave-guiding element is responsive to a control electrical field and said effective index of refraction changes with said control electrical field.

7. A device as in claim 6, wherein said wave-guiding element includes an electro-optic material.

8. A device as in claim 1, further comprising a transducer engaged to at least two parts on said wave-guiding element, said transducer operating to change a length of said wave-guiding element.

9. A device as in claim 8, wherein said transducer includes a magnetostrictive element operable to change said length of said wave-guiding element in response to a control magnetic field.

10. A device as in claim 9, wherein said control magnetic field has a uniform field distribution along said optic axis of said wave-guiding element.

11. A device as in claim 8, wherein said transducer includes a piezoelectric element operable to change said length of said wave-guiding element in response to a control voltage.

12. A device as in claim 1, wherein said period nonlinearly varies along said optic axis.

13. A device as in claim 1, wherein said wave-guiding element includes a fiber.

14. A device as in claim 1, wherein said wave-guiding element includes an optical wave-guide.

15. A device as in claim 1, further comprising an acoustic wave generator disposed relative to said wave-guiding element and configured to produce a frequency-tunable acoustic wave along said optic axis of said wave-guiding element, wherein said acoustic wave alters a frequency response of said optical perturbation region.

16. An optical device, comprising:

a segment of fiber;

a fiber grating formed in said fiber, said fiber grating having a grating period that changes along said fiber in a nonlinear manner to effect different delays for optical waves of different frequencies that are Bragg phase-matched in said fiber grating; and a fiber stretcher engaged to said fiber grating and configured to change a length of said fiber grating to produce a change in relative delays of said optical waves at said different frequencies.

17. A device as in claim 16, further comprising a grating control unit, communicating with said fiber stretcher to control said length of said fiber grating.

18. A device as in claim 17, wherein said fiber grating is configured to have an index of refraction that changes with an electromagnetic radiation field produced by said grating control unit.

19. A device as in claim 18, wherein said fiber grating includes a photosensitive material.

20. A device as in claim 19, wherein said photosensitive material is a photorefractive material.

21. A device as in claim 18, wherein said electromagnetic radiation field has an intensity variation along said fiber.

22. A device as in claim 17, wherein said fiber grating is configured to have an index of refraction that changes with a control electrical field produced by said grating control unit.

23. A device as in claim 22, wherein said control electrical field varies with a position along said fiber.

24. A device as in claim 22, wherein said fiber grating includes an electro-optic material.

25. A device as in claim 17, wherein said fiber stretcher includes a piezoelectric element operable to produce a specified amount of length change in said fiber grating in response to a control voltage and said grating control unit is configured to produce said control voltage.

26. A device as in claim 17, wherein said fiber stretcher includes a magnetostrictive element operable to change said length of said fiber grating in response to a control magnetic field and said grating control unit is configured to produce said control magnetic field.

27. A device as in claim 16, wherein said fiber grating is configured to have an index of refraction that changes with a position along said fiber.

28. A device as in claim 16, further comprising an acoustic wave generator disposed relative to said fiber grating and configured to produce a frequency-tunable acoustic wave along said fiber, wherein said acoustic wave alters a frequency response of said fiber grating.

29. An optical system capable of dynamically adjusting dispersion compensation, comprising:

a dispersion analyzer, operating to receive a portion of an optical signal and determine information about dispersion in said optical signal; and a dispersion compensating element coupled to receive said information from said dispersion analyzer and configured to receive at least a portion of said optical signal and to produce a reflected signal with a reduced amount of dispersion in response to a control signal from said dispersion analyzer, said dispersion compensating element including:

a wave-guiding element having an optic axis to transport optical energy and an effective index of refraction which is a function of a position along said optic axis; and a grating formed in said wave-guiding element and configured to have a variable grating period along said optic axis, wherein a product of said variable grating period and said effective index of refraction is a nonlinear function of a position along said optic axis to effect a Bragg phase-matching condition so that a reflected optical wave from said grating has a specified wavelength that has a nonlinear dependence on a position along said optic axis.

30. A system as in claim 29, wherein said optical signal includes a wavelength-division multiplexed signal.

31. A system as in claim 29, wherein said dispersion analyzer includes a converting element that converts a phase-modulated optical signal into an amplitude-modulated signal.

32. A system as in claim 29, wherein said dispersion analyzer includes a device operable to directly measure a bit error rate in said optical signal to indicate said dispersion, said dispersion analyzer producing said control signal to adjust said tunable dispersion compensation of said dispersion compensating element such that said bit error rate is reduced.

33. A system as in claim 29, wherein said dispersion analyzer includes a clock monitor device that measures a clock amplitude of said optical signal and produces said control signal such that said dispersion compensating element adjusts said dispersion compensation to increase said clock amplitude.

34. An optical device, comprising:

a semiconductor laser;

an electrical power supply connected to said semiconductor laser to provide a modulated driving current which causes a modulated laser output from said laser;

a waveguide grating disposed to receive said modulated laser output and having a variable grating period and an effective index of refraction to effect a Bragg phase-matching condition so that a reflected laser beam of said modulated laser output from said waveguide grating has a specified wavelength that has a nonlinear dependence on a position along said waveguide grating;

a grating control unit coupled to said power supply and configured to control a dispersion characteristics of said waveguide grating to reduce a frequency chirp in said modulated laser output.

35. A device as in claim 34, wherein laser and said waveguide grating are formed on a semiconductor substrate.

36. An optical device, comprising:

a segment of waveguide having an optic axis to transport optical energy;

an optical perturbation region formed in said waveguide and having a variation in a refractive index along said optic axis to define a nonlinearly chirped grating, said nonlinearly chirped grating having a position-varying period that changes nonlinearly along said optic axis and reflecting an optical wave of a specified wavelength which has a nonlinear dependence on a position along said optic axis; and a waveguide controller to control a parameter of said optical perturbation region as to vary relative time delays of different spectral components of a reflected optical wave.

37. A device as in claim 36, wherein said waveguide controller includes a piezoelectric element engaged to change a length of said nonlinearly chirped grating.

38. A device as in claim 36, wherein said waveguide controller includes a magnetostrictive element engaged to change a length of said nonlinearly chirped grating.

39. A device as in claim 36, wherein said optical perturbation region includes an electro-optic material and said waveguide controller produces a control electrical field that changes the index of refraction of said electro-optic material.

40. A device as in claim 36, wherein said optical perturbation region includes a radiation-sensitive material and said waveguide controller produces a radiation field that changes the index of refraction of said radiation-sensitive material.

41. A device as in claim 36, further comprising an acoustic wave generator coupled to produce a frequency-tunable acoustic wave along said waveguide so as to alter a frequency response of said nonlinearly chirped fiber grating.

42. A method for operating a fiber system, comprising:
   directing an optical signal that is transmitted through a dispersive signal path into a tunable nonlinearly chirped fiber grating;
   determining a polarity and an amount of dispersion in said optical signal; and
   adjusting said tunable nonlinearly chirped fiber grating according to said polarity and amount of dispersion to reduce dispersion in said optical signal.

43. A method as in claim 42, wherein adjusting said tunable fiber grating is performed by adjusting an intensity of an electromagnetic radiation field along said fiber grating.

44. A method as in claim 42, wherein adjusting said tunable fiber grating is performed by adjusting a magnetic field along said fiber grating.

45. A method as in claim 42, wherein determining a dispersion in said optical signal is performed by directly measuring a bit error rate in said optical signal.

46. A method as in claim 42, wherein determining a dispersion in said optical signal is performed by measuring an amplitude-modulated signal that is converted from a phase modulation in said optical signal.

47. A method as in claim 42, wherein determining a dispersion in said optical signal is performed by measuring a clock amplitude.

48. A method as in claim 42, wherein said fiber grating has a grating period that changes along said fiber in a nonlinear manner to effect different delays for optical waves of different frequencies that are Bragg phase-matched in said fiber grating.

49. A method as in claim 42, wherein said fiber grating has an index of refraction that changes along said fiber in a nonlinear manner to effect different delays for optical waves of different frequencies that are Bragg phase-matched in said fiber grating.

50. A method as in claim 42, wherein adjusting said tunable fiber grating is performed by stretching said fiber grating.

51. A method as in claim 47, wherein adjusting said tunable fiber grating is performed by tuning a frequency of an acoustic wave that is launched into said fiber grating.

52. A method as in claim 42, wherein adjusting said tunable fiber grating is performed by adjusting an electrical field along said fiber grating.

* * * * *